Dec. 9, 1969  P. L. MAY ET AL  3,482,456
POWER TAKE-OFF ADAPTER BOX FOR TRACTOR P.T.O. DRIVEN IMPLEMENTS
Filed July 17, 1968  3 Sheets-Sheet 3
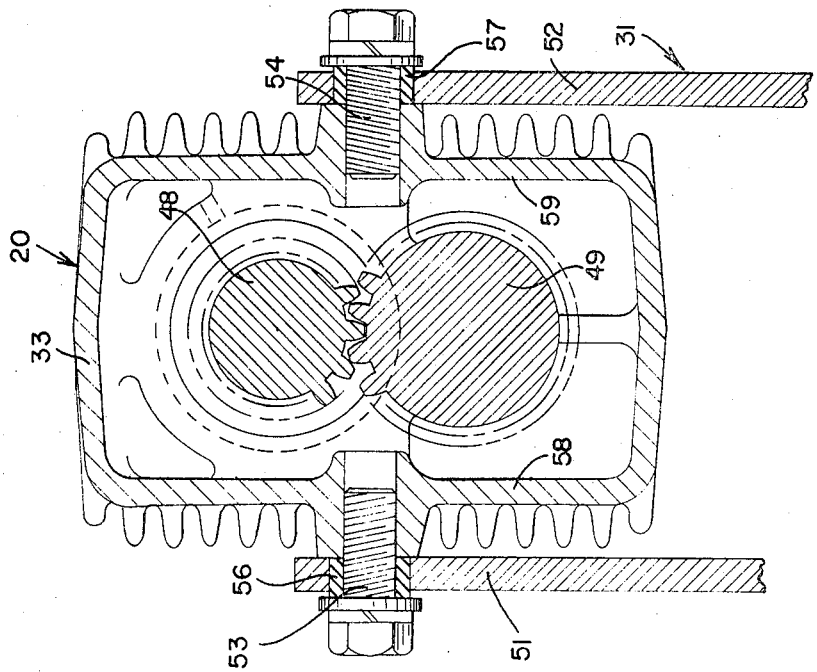
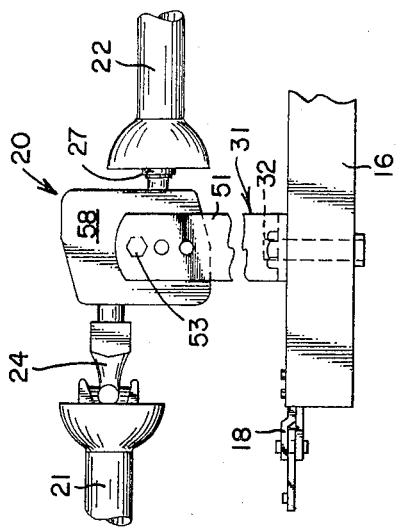
INVENTORS
PATRICK L. MAY
RALPH E. BEYER
BY
ATT'Y.

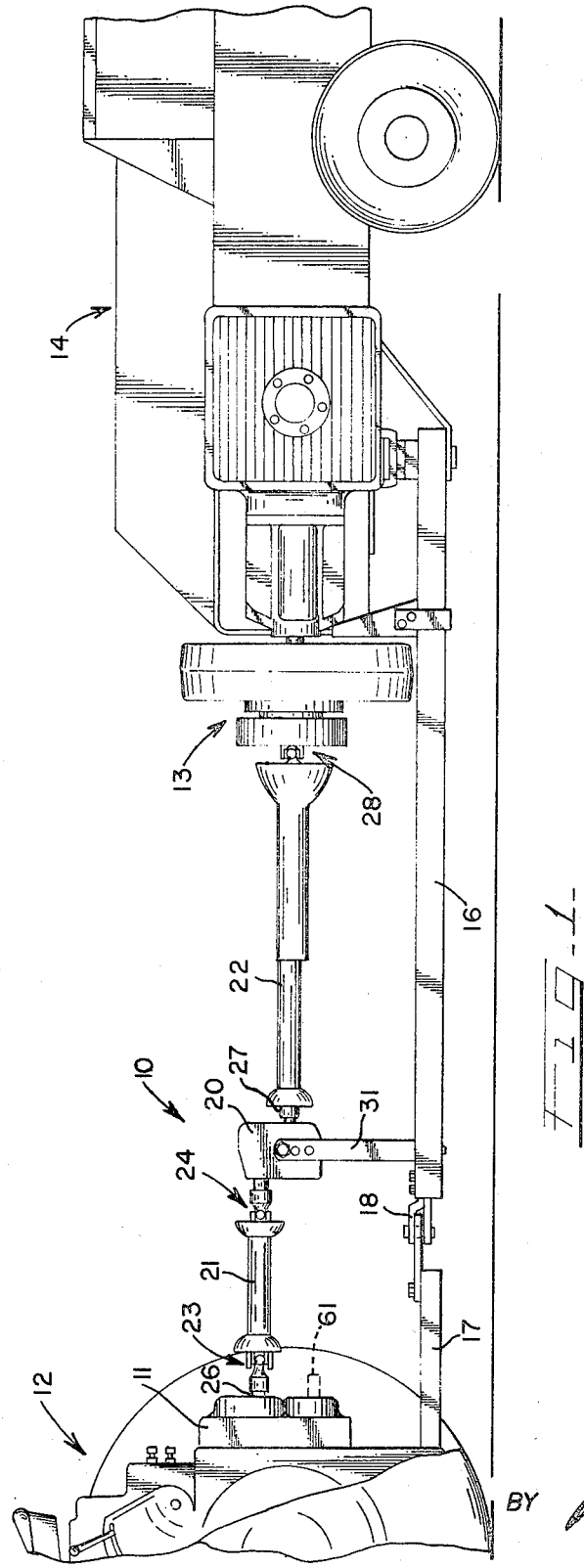

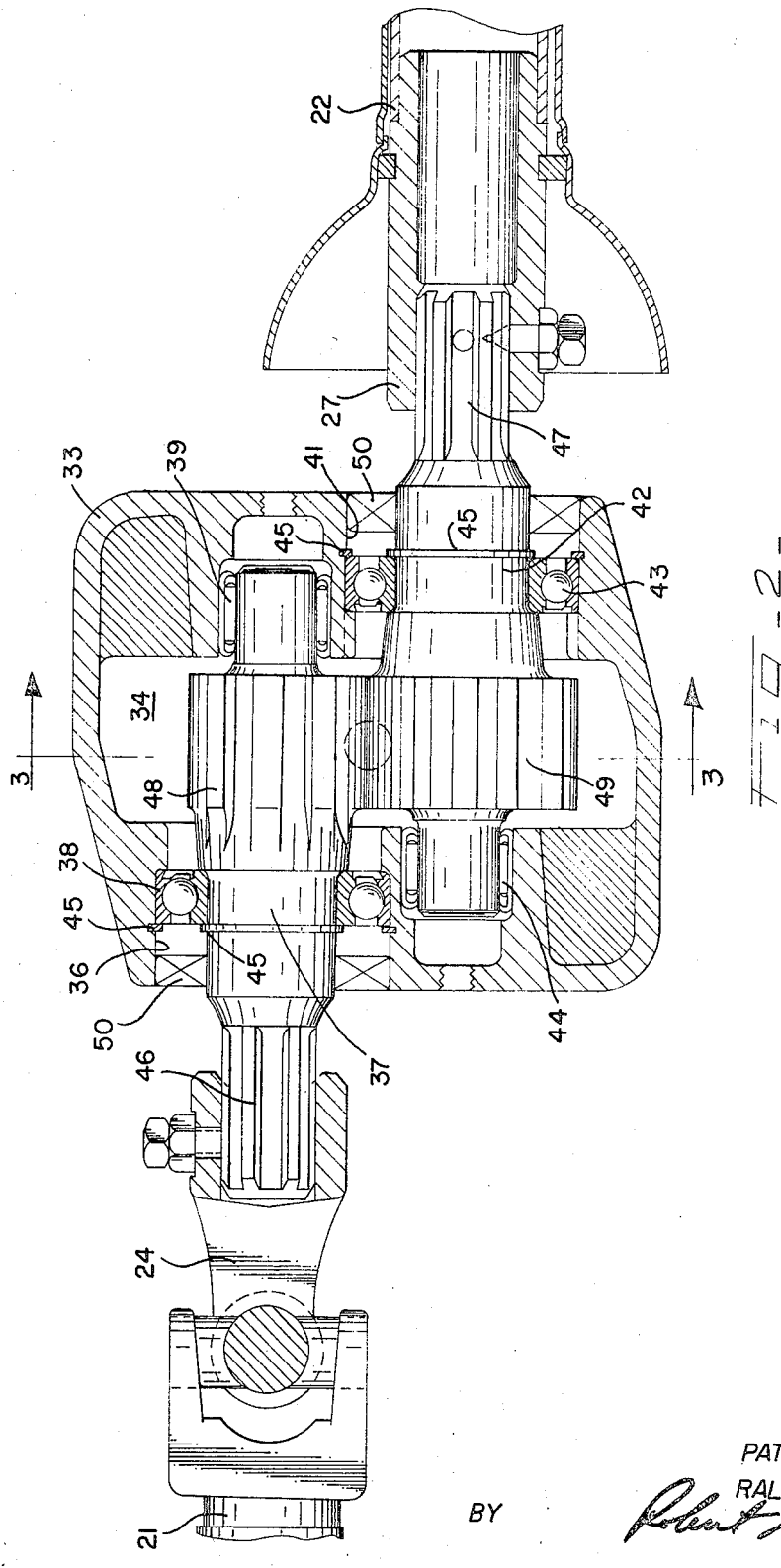

United States Patent Office 3,482,456
Patented Dec. 9, 1969

3,482,456
POWER TAKE-OFF ADAPTER BOX FOR TRACTOR
P.T.O. DRIVEN IMPLEMENTS
Patrick L. May and Ralph E. Beyer, Memphis, Tenn., assignors to International Harvester Company, Chicago, Ill., a corporation of Delaware
Filed July 17, 1968, Ser. No. 746,708
Int. Cl. F16h 37/12
U.S. Cl. 74—11                                    7 Claims

ABSTRACT OF THE DISCLOSURE

A power take-off drive assembly for coupling a tractor and an associated implement, said assembly including a gear box for selectively reducing or stepping-up the speed of power delivered by the tractor power take-off to a constant implement speed.

BACKGROUND AND SUMMARY OF THE INVENTION

The present invention relates generally to a power take-off drive assembly and more particularly to reversible gear box in a drive assembly operable to permit a farm implement to be driven by either the standard high speed power take-off drive or the standard low speed power take-off drive of associated tractors.

The power take-off drive of tractors are designed primarily to transmit torsional loads to an associated implement. Conventionally tractors are provided with either a high speed power take-off drive which is designed to operate at a speed of 1000 r.p.m., or a low speed power take-off drive designed to operate at a speed of 540 r.p.m. Therefore an implement capable of operating with either the high speed or low speed drives must be equipped with an adapter for converting one speed to the other. Heretofore the implement has been designed to operate at one of the standard speeds, e.g. the 540 r.p.m. speed, with an adapter provided to step down the 1000 r.p.m drive to the 540 drive. Such an arrangement requires two separate drive assemblies—one with the adapter and the other without.

The purpose of the present invention is to provide a single drive assembly adapted to be used with either the low speed power take-off drive or the high speed power take-off drive.

The invention contemplates the use of a gear box having a pinion shaft and a gear shaft arranged in parallel and intermeshing relation. Means are provided for moving the gear box means to interchange the positions—one position for operation with the high speed drive and the other for operation with the low speed drive. In either position power is delivered to the implement at a constant predetermined speed.

Briefly, the objects of the present invention are: To lend versatility to the field drawn implement by providing means for adapting the implement drive to either the standard high speed and standard low speed power take-off drives; and to provide a baler with means for rapid connection to either type of standard take-off drives requiring no additional parts.

These and other objects will become apparent to those skilled in the art from the following disclosure taken in conjunction with the attached drawings.

DRAWINGS

FIGURE 1 is an elevational view of the drive assembly contemplated by this invention shown interconnecting a tractor and an associated baler;

FIGURE 2 is a longitudinal sectional view of the gear box included in the drive assembly shown in FIGURE 1;

FIGURE 3 is a transverse sectional view of the gear box shown in FIGURE 2 and taken along a plane indicated by line 3—3 thereon; and FIGURE 4 is an enlarged fragmentary view of the gear box shown in FIGURE 1 and illustrating the mounting means thereof.

DESCRIPTION OF THE PREFERRED EMBODIMENT OF THE INVENTION

As shown in FIGURE 1 a drive assembly 10 interconnects a power take-off drive 11 of a tractor 12 and a power receiving assembly shown generally at 13 of an associated baler 14. The baler 14 is adapted to be towed by the tractor 12 by means of an assembly comprising a baler hitch 16 and a tractor drawbar 17 interconnected by clevis 18.

The drive assembly 10 includes a gear box 20, a forward shaft 21, and a rear, telescoping shaft 22. The forward shaft 21 carries at its opposite ends universal joints 23 and 24 which include knuckles for connection, respectively, with a standard high speed power take-off shaft 26 of the power take-off drive 11 and the power input shaft (described below) of the gear box 20. Likewise the rear drive shaft 22 carries at its opposite ends connectors 27 and 28 for connection respectively with the gear box output shaft (described below) and the power receiving assembly 13 of the baler 14.

A bracket 31 mounted at the forward end of the hitch 16 and secured thereto by bolt 32 provides the means for pivotally supporting the gear box 20 (see FIGURE 4).

The present invention is specifically directed at the gear box 20 and its mounting 31, it being understood that the other components described therewith are by way of illustration only to set the environment for the invention.

The gear box 20 will be described in detail with reference to FIGURES 2 and 3. The gear box 20 includes a housing 33 defining an internal cavity 34 therein. A forwardly opening aperture 36 in the housing 33 communicates with the cavity 34 and receives a pinion shaft 37, the shaft 37 being journaled at axially spaced points by conventional bearings 38 and 39. A rearwardly opening aperture 41 formed in the housing 33 communicates with the cavity 34 and receives a gear shaft 42 journaled at axially spaced points by bearings 43 and 44. The shafts 37 and 42 are arranged in parallel and respectively have forwardly and rearwardly extending splined portions 46 and 47 for connection with the main drive shafts 21 and 22 respectively. Integrally formed on shaft 37 and disposed in cavity 34 is a pinion 48 which meshes with a gear 49 integrally formed on shaft 42. Conventional snap rings 45 are provided for each of the shafts 37 and 42 for maintaining the parts in assembled relation. Suitable seals 50, 50 enclose the annulus between the shafts (37, 42) and their respective aperture (36, 41).

The splined portions 46 and 47 are identical in structure, both being interchangeably adapted to fit connectors 24 and 27.

As shown in FIGURES 3 and 4 the bracket 31 includes a pair of laterally spaced legs 51 and 52 disposed on opposite sides of the gear box 20. Trunnions 53 and 54 threaded to opposite sides 58 and 59 of the gear box 20 and projecting outwardly therefrom are received through bearings 56 and 57 mounted in the upper ends of legs 51 and 52 and therewith provide the means for pivotally supporting the gear box 20. The trunnions 53 and 54 are positioned at the geometric center of the sides 58 and 59 so that 180° pivotal movement of the gear box 20 reverses the positions of splined portions 46 and 47.

Since the external shaft portions 46 and 47 are identical in structure and interchangeable in position, it is apparent that both shafts 37 and 42 can be positioned to act as the input or the output shaft of the gear box 20. For example, with the gear box 20 positioned as shown in FIGURE 2, external portion 46 is disposed for connection with the drive shaft connector 24, whereas external portion 47 is disposed 180° angularly removed therefrom for connection with the rear drive shaft connector 27. Hence pinion shaft 37 receives the input power from the forward drive shaft 21 while the gear shaft 42 delivers power at a reduced speed to the rear drive shaft 22. In the reversed position, the functions of the shafts 37 and 42 are reversed—the gear shaft 42 receives power and the pinion shaft 37 delivers it at a stepped-up speed.

With the gear shaft 42 disposed for connection with the forward drive shaft 21, the gear box 20 is positioned to operate with a tractor having a low speed power take-off drive 11, e.g. 540 r.p.m. (power take-off shaft 61 is shown in phantom in FIGURE 1). The drive shaft 21 provided with the proper connector 23 interconnects the power take-off shaft 61 and the gear shaft 42.

Returning to FIGURE 2, the intermeshing pinion 48 and gear 49 mounted internally of gear box 20 are particularly sized to provide a constant output speed for the gear box 20 whether acting as a speed reducer when driven by a high speed power take-off drive 26 or acting as a speed step-up when driven by a low speed power take-off drive 61. As established by the A.S.A.E. the high speed and low speed drives have been standardized at 1000 r.p.m. and 540 r.p.m., respectively. The square root of a ratio of the high speed (1000 r.p.m.) and low speed (540 r.p.m.) gives a gear ratio of 1.357. Thus the combination of the high speed power take-off drive 26 and the gear box 20 delivers rotary power to the implement at 736.9 r.p.m. or approximately 735 r.p.m. The combination of the low speed power take-off drive 61 and the gear box 20 delivers power at 732.7 r.p.m., or approximately 735 r.p.m. In order for the implement 14 to accommodate either drive then it must be designed to receive power at approximately 735 r.p.m.

It should be observed that, in mechanical terms, the gear box 20 constitutes a mounting frame and that a variety of drive means such as a chain and sprocket assembly could be used in place of the gear train comprising pinion shaft, pinion gear, and gear shaft. The gear box enclosing the internal gears is but one embodiment and is presented by way of illustration only.

The operation of the gear box of this invention will be described with reference to FIGURE 2. Assuming that the baler 14 is to be coupled with a tractor 12 having a high speed power take-off drive 26, the gear box 20 is positioned to act as a speed reducer; that is, the pinion shaft 37 receives power and the gear shaft 42 delivers power. The external splined portion 46 projects forwardly disposed for connection with the forward drive shaft 21 which in turn is attached to shaft 26 of the drive 11. The external portion 47 projects rearwardly disposed for connection with the rear drive shaft 22 which is attached to the implement drive 13. With the assemblies so arranged, power is delivered to the gear box 20 through the drive shaft 21 at a speed of 1000 r.p.m. and thence through the rear drive shaft 22 to the implement 14 at a speed of approximately 735 r.p.m. Now, if per chance the tractor 12 to be associated with the implement 14 has only a low speed power take-off drive 61, the gear box 21 is pivoted substantially 180° about the pivot axis defined by the trunnions 53 and 54 constrained by the bracket 31, reversing the positions of the external portions 46 and 47 of shafts 37 and 42, respectively. In this position, the gear box 20 acts as a speed step-up. The forward drive shaft 21 interconnects the low speed drive 61 and the gear shaft 42, and the rear drive shaft 22 couples the output pinion shaft 37 and the implement drive 13. Speed is then stepped-up from 540 to approximately 735 r.p.m.

Thus it has been demonstrated that the gear box 20 constructed according to this invention adds versatility to the power take-off drive assemblies for coupling a tractor and an associated implement by enabling the implement to be driven by either a high speed or low-speed power take-off drive.

What is claimed is:

1. An apparatus for adapting an implement drive to a tractor power take-off drive having either a high speed power take-off shaft or a low speed power take-off shaft, said apparatus comprising:

a frame;

means for movably mounting said frame on said implement;

power transmitting means including first and second shafts journaled to said frame and arranged in parallel relation, said shafts having substantially interchangeable coupling means extending from said frame in opposite directions, and drive means interconnecting said shafts, said frame being movable to interchange the positions of said shafts, said first shaft in one of said positions being disposed for receiving power from said high speed power take off shaft and said second shaft being disposed for delivering power to said implement drive, and said second shaft in the other of said positions being disposed for receiving power from said low speed power take-off shaft and said second shaft being disposed for delivering power to said implement drive, said drive means being particularly sized to provide for a substantially constant power delivery speed to said implement for both of said positions of said housing.

2. An apparatus for adapting an implement drive to a tractor power take-off drive having either a high speed power take-off shaft or a low speed power take-off shaft, said mechanism comprising:

a housing;

means for movably mounting said housing on said implement;

power transmitting means including a pinion shaft and a gear shaft journaled to said housing and arranged in parallel relation, said shafts having substantially interchangeable coupling means extending from said housing in opposite directions, and gear means interconnecting said shafts, said housing being movable to interchange the positions of said shafts, in one of said positions said pinion shaft being disposed for receiving power from said high speed power take-off shaft and said gear shaft being disposed for delivering power to said implement drive, and in the other of said positions, said gear shaft being disposed for receiving power from said low speed power take-off shaft and said pinion shaft being disposed for delivering power to said implement drive, said gear means being particularly sized to provide for a substantially constant power delivery speed to said implement for both positions of said housing.

3. The invention as recited in claim 2 wherein said gear means includes a single pinion and a single gear respectively mounted on said pinion shaft and said gear shaft.

4. The invention as recited in claim 3 wherein said gear and said pinion are particularly sized to provide a gear ratio equal to the square root of the ratio of the speeds of said high and low speed power take-off shafts.

5. The invention as recited in claim 3 wherein said high and low speed drives are respectively 1000 and 540 r.p.m. drives and said pinion and said gear are sized to provide a gear ratio of approximately 1.36 whereby power is delivered to said implement at a speed substantially equal to 735 r.p.m. with said housing in either of said positions.

6. The invention as recited in claim 2 wherein said mounting means includes hinge means whereby said housing may be swung from one of said positions to the other of said positions.

7. The invention as recited in claim 6 wherein said hinge means includes trunnion means, and said shafts lie substantially in the same vertical plane, said housing being swingable in generally said vertcial plane between said interchanged positions.

References Cited

UNITED STATES PATENTS

| | | | |
|---|---|---|---|
| 3,001,409 | 9/1961 | Von Fumetti | 74—11 |
| 3,059,505 | 10/1962 | Reicks | 74—11 X |
| 3,412,624 | 11/1968 | Wells | 74—11 X |

LEONARD H. GERIN, Primary Examiner

U.S. Cl. X.R.

180—53